Aug. 23, 1960   W. A. COMPTON ET AL   2,950,083
BLADE ASSEMBLY
Filed July 23, 1954   2 Sheets-Sheet 1
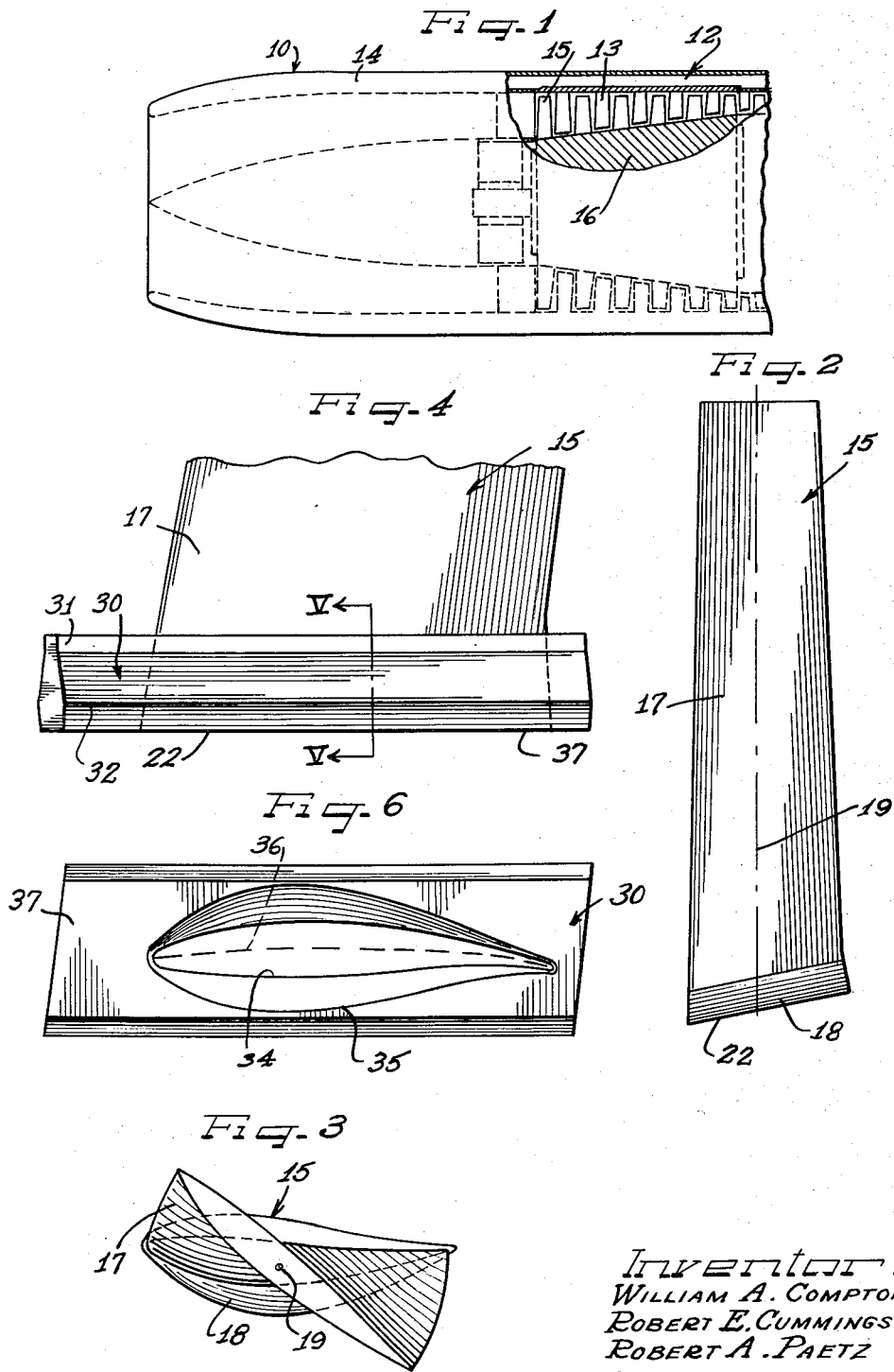
Inventors
WILLIAM A. COMPTON
ROBERT E. CUMMINGS
ROBERT A. PAETZ Aug. 23, 1960   W. A. COMPTON ET AL   2,950,083
BLADE ASSEMBLY
Filed July 23, 1954   2 Sheets-Sheet 2
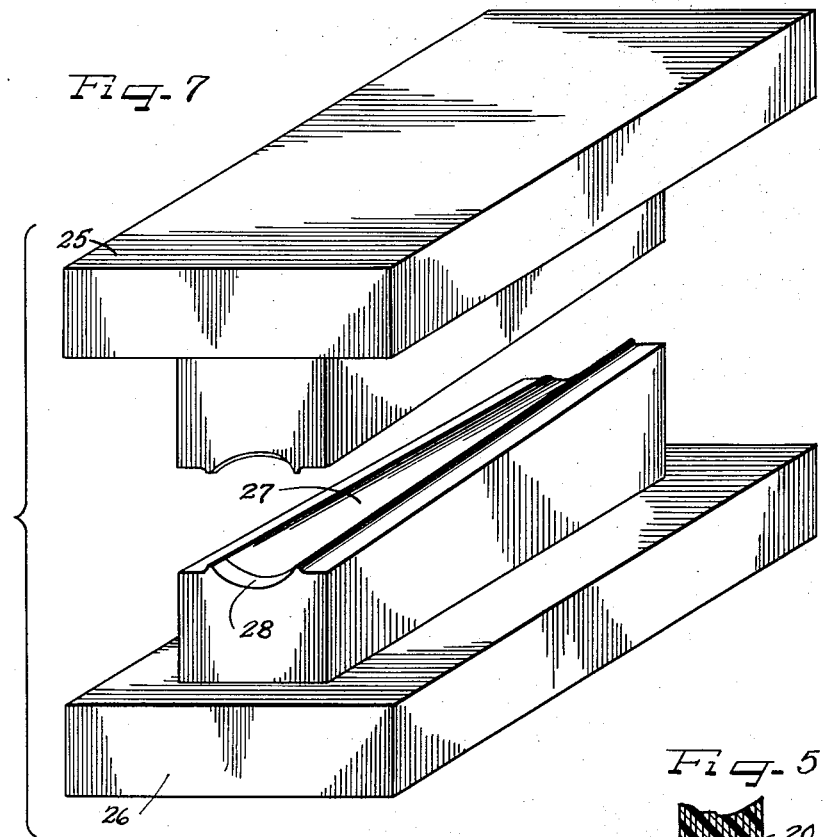
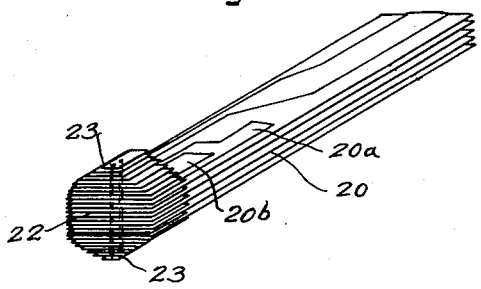
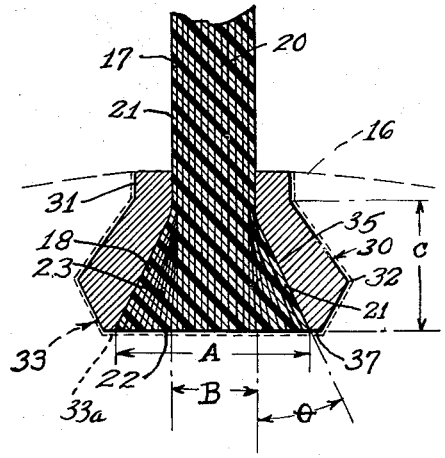
Inventors
WILLIAM A. COMPTON
ROBERT E. CUMMINGS
ROBERT A. PAETZ
by Hill, Sherman, Meroni, Gross & Simpson
Attys.

2,950,083
Patented Aug. 23, 1960

United States Patent Office

2,950,083
BLADE ASSEMBLY

William A. Compton, Euclid, and Robert Edward Cummings and Robert A. Paetz, University Heights, Ohio, assignors to Thompson Ramo Wooldridge Inc., a corporation of Ohio Filed July 23, 1954, Ser. No. 445,286

4 Claims. (Cl. 253—77)

The present invention relates to the construction of blades for axial flow compressors or the like, and more particularly concerns the construction of a laminated plastic blade and an attachment structure therefor capable of providing an exceptional strong union between the blade and the rotor or stator supporting it.

The development of the modern jet engine for aircraft of various types has led to great advances in compressor structure since air compressors, ordinarily of the axial flow type, are almost universally used with such engines. In view of the desire to reduce the engine weight to an absolute minimum it has been found desirable to replace the conventional steel compressor blades with a lighter material having suitable strength properties. As a substitute for steel or other alloys, the present invention proposes, and has found satisfactory in use, the use of laminated plastics.

Unfortunately, while plastic laminates and some other similar materials have exceptionally satisfactory resistance to bending and are very light in weight, they have orthotropic and/or selective strength properties which create difficulties in securing the blades to a high speed rotor. In view of the fact that rotor speeds in common use today are commonly as high as 20,000 revolutions per minute the centrifugal forces, entirely aside from the forces applied to the blades by the action of air thereon, are extremely great and it is absolutely necessary, in the manufacture of a suitable blade, to provide a blade root or connecting means capable of resisting the forces tending to pull the blades out of the rotor.

As noted above, laminated plastics have great strength against forces acting along a line at a substantial angle to the general plane of the laminations but have far less strength against cleavage along the plane of the laminations. Thus, it has been found that the provision of a molded blade root of the conventional fir tree or dove-tail types is unsatisfactory. Such molded roots project a substantial distance away from the surface of the blade, forming, in fact, a change in blade contour of substantially 90°. Such blade roots, when constructed of laminated plastic, have been found to have a tendency to shear at the junction between the blade and the root, thereby permitting the blade to fly outwardly when operating at extremely high speeds.

In order to overcome the above mentioned difficulty, applicants have provided a laminated plastic blade having an outwardly splayed base having a relatively gradual change in surface direction from that of the surface of the blade in general. This splayed end is seated in a conforming splayed recess in a separable dove-tail or fir tree base member which has an external configuration of conventional form for cooperation with conventional dove-tail or fir tree slots in the rotor. By this construction, the advantages of the fir tree or dove-tail base are retained and, at the same time, the disadvantages of laminated materials are completely avoided.

It is therefore an object of the present invention to provide a novel blade construction for compressors or the like.

Another object of the present invention is to provide a laminated blade construction having a blade root cooperating with a base member having an outer configuration of conventional form.

Yet another object of the present invention is to provide a laminated blade construction having an exceptionally great root strength.

Another object of the invention is to provide a laminated blade having a root formed by an extension of the surface laminations thereof and being splayed at a relatively small angle at the root thereof for retention thereof in a rotor periphery.

A feature of the present invention is a separable blade base cooperating with a splayed blade for retention of the latter in a rotor slot.

Another feature of the invention resides in the construction of a compressor blade or the like having the base end thereof splayed outwardly from the general surface of the blade to provide a blade holding area substantially greater than and directly proportional to the instantaneous thickness of the blade along its mean line.

Still a further object of the present invention is the provision of a blade having a splayed root in combination with an apertured base wherein the air foil of the blade may be passed through said aperture and said splayed root cooperates with the walls of the aperture to retain the blade against further movement therethrough.

Still another object of the present invention is to provide a structurally satisfactory laminated blade construction for use in compressors or the like.

Still other and further objects of the present invention will at once become apparent to those skilled in the art from a consideration of the attached drawings wherein a preferred embodiment of the invention is shown by way of illustration only, and wherein:

Figure 1 is a side elevational view of an axial flow compressor incorporating the present invention, portions being broken away for the sake of clarity;

Figure 2 is an enlarged side elevational view of a laminated compressor blade constructed according to the present invention;

Figure 3 is a top plan view of the compressor blade shown in Figure 2;

Figure 4 is a side elevational view of the blade base constructed according to the present invention and having the blade root positioned therein;

Figure 5 is a cross-sectional view taken along the line V—V of Figure 4;

Figure 6 is a bottom view of the blade base constructed according to the present invention without the blade positioned therein;

Figure 7 is an isometric view of apparatus suitable for the manufacture of blades according to the present invention; and Figure 8 is an isometric view of a plurality of laminations in their stacked relation prior to the impregnation and curing thereof in the apparatus of Figure 7.

As shown on the drawings:

As shown in Figure 1, a jet engine generally indicated at 10 having an air inlet 11 is provided with a rotary axial flow type compressor generally indicated at 12 for compressing the air on its way from the inlet 11 to the fuel burners downstream of the compressor. As may be seen, the compressor comprises a plurality of stages each of which consists of a row of stator blades 13 secured to the outer housing 14 of the engine and a row of rotor blades 15 secured to the periphery of the rotor 16. In general, the overall arrangement shown is conventional and it will be understood that the blades constructed according to the present invention may be utilized in differing types of compressors without departing from the scope of the invention.

Both the rotor and stator blades 15 and 13, respectively, can be manufactured in accordance with the present invention but it is especially important that the rotor be constructed as described below in view of the large radially directed forces applied to the rotor blades during high speed operation. The rotor blades, generally indicated at 15, each comprise a blade portion 17 and a root portion 18. The blade portion is twisted from root to tip about the stacking line 19, as may be seen from Figure 3 and is composed of a plurality of thin sheets or laminations, preferably woven fiberglass secured together in a polymerized resin, preferably of the phenolic type.

As will be appreciated, the sandwiching of the fiberglass sheets with the layers of resin will provide a structure capable of shear separation at the layers at a stress of substantially less than that necessary to cause fracture in bending. Since it is essential that the root 18 of the blade project out of the general plane of the blade into interlocking contact with the hub in some manner, it is therefore essential that a projection be provided on the the blade. In view of the relative weakness of any resin merely added at the base, or added in the form of additional layers of fiberglass, such additions being susceptible to shear under centrifugal forces applied to the blade during rotation, the present invention contemplates the gradual enlargement of the blade root with a continuation of the surface fibers of the blade into the surface of the root. This arrangement may be seen in Figure 5 wherein the main portion of the blade 17 is shown to comprise a plurality of layers of fiberglass 20 forming a core and having several wrap-around layers 21 at the outside surface. The layers 21 as may be seen, continue downwardly along the surface of the blade portion 17 and thence along the surface of the root 18, while the core layers 20 extend generally straight to the base 22 of the root. The angular volume between the surface layers 21 at the root portion and the core layers 20 is filled in by a plurality of layers 23 of fiberglass. The layers 23 extend axially along the blade 15 only a relatively short distance and in practice it has been found satisfactory to use layers somewhat less than the depth of the root 18.

In the manufacture of the laminated blade above discussed, a plurality of longitudinally extending layers or mats of fiberglass 20 are stacked generally as indicated in Figure 8. The core layers 20 include a majority of layers extending the complete length of the blade but also includes several shorter layers on each side of the main body of layers 20 shown in the form of layers 20a and 20b. The layers 20a and 20b are utilized to provide a slight axial and spanwise taper to the finished blade. A plurality of short layers or mats 23 are then positioned immediately adjacent the base 22 of the layers 20 and subsequent to this positioning a strip of fiberglass 21 having a width substantially equal to the longitudinal length of the layers 20 is wrapped around the surface of the core formed by the members 20 and 23. Preferably this outer layer 21 is wrapped several times about the core. In the steps just above mentioned, the layers of fiberglass 20 are impregnated with uncured polymerizable polyester or similar resin which preferably completely saturates the fibers of the fiberglass layers, including the outer wrap around layer 21 shown in Figure 5 but not shown in Figure 8.

After the surface layer 21 has been wrapped around the core the entire mass is placed between a pair of die members 25 and 26 having a generally longitudinally extending mold cavity 27 with an outwardly flared base portion 28. As will be noted from the drawings in Figure 7, the mold 26 is constructed to provide, with a combination die 25, the twist of the blade viewed in Figure 3. With the impregnated blade mass in position in the die cavity, the dies 25 and 26 are forced together, in the presence of the necessary catalysts, which may take the form of heat, and maintained in that position until the resinous material has polymerized into a hardened condition. It will be understood, of course, that the ends of the mold cavity 27 may be closed during the curing cycle in order to permit the application of pressure under circumstances in which high pressure is essential to satisfactory curing.

The result of the above manufacturing process is a blade 15 having a surface layer 21 which extends throughout the entire length of the blade including the blade portion 17 and the root 18. This layer has extremely great strength in tension along its longitudinal axis and spanwise. By providing a root which gradually tapers outwardly from the main body of the blade 17 only a limited amount throughout the entire root area, no portion of the surface layer 21 ever flares out more than a few degrees. Thus, when grasped by the root 18, forces applied along the length of the blade 17 are essentially applied to the surface layer 21, at its junction between the portions 17 and 18, in tension rather than in shear or bending. Further, it is apparent that no possible shear between adjacent layers of fiberglass secured together solely by means of an intermediate area of resin, is possible.

In effectively making use of a tensile strength of the layer 21 without requiring abrupt changes in direction which would weaken the structure, a separate base member 30 is utilized. As may be seen from Figures 4, 5 and 6, the base member 30 comprises a bar extending generally transversely of the longitudinal axis of the blade and having a restricted outer neck portion 31 tapering outwardly to a maximum width at 32. The width of the neck portion 31 as well as the maximum width at 32, is constant throughout the entire spanwise length of the bar 30 and the bar with the blade in place as shown in Figure 4 is adapted to be slid into a dovetail slot as shown by the dotted lines 33 in Figure 5. Viewing the base member or bar 30 from underneath, as shown in Figure 6, it will be noted that the minimum dimension of the aperture generally indicated at 34 and passing therethrough, takes the general form of the air foil of the blade portion 17. From this dimension, the aperture progresses gradually to the largest dimension 35. It has been found that in the manufacture of the blade of the present invention a root taper which provides a cross-sectional dimension A as viewed in Figure 5, bearing a constant relationship to the blade cross-section thickness B is preferred. Thus, the median line 36 (Fig. 6) of the blade 15 is also the median line for the base 22 of the root 18. In view of the fact that the distance C between the maximum effective dimension 35 and the junction between the root 18 and the blade portion 17 is constant as shown, the angle $\theta$ will vary at cross-sectional points along the median line 36.

In one embodiment of the present invention which has proven eminently satisfactory in high speed operations, the ratio $A/B = 2.2$ was used in combination with a dimension $C = .2125$ inch. With this structural relationship, the angle $\theta$ varies from a minimum of approximately 6° to a maximum of approximately 26° at the point of maximum width of the blade.

By maintaining the relationship of the dimension A to the dimension B at a constant value, the area of the root 18 that is actually operating to prevent movement of the blade outwardly through the aperture 34 of the bar 30, equals the transverse width of the blade plus the area A minus B and this area is directly proportional to the thickness of the blade itself throughout its transverse width. Since the mass of the blade which must be retained at any instantaneous point along its transverse width, varies with the thickness of the blade at that point, and since the radial force to be restrained is directly proportional to the mass, it will be apparent that the retentive resistance at any particular point, or A minus B at that point, will bear the same relationship to the force urging the blade outwardly at that point as the retentive force will bear to the force urging outward movement of the blade at all other points along its transverse width. This provides an even application of the forces tending to resist outward movement of the blade thereby preventing any warping of the blade under high speed operation as a result of unequal stress distribution.

While it is considered that the construction of a blade root having the relationship $A/B$ equals a constant it will be appreciated that this constant may vary, depending upon the forces acting on the blade 17 in the outward direction. These forces depend upon the designed speed of operation with the constant necessarily being greater as the design speed of rotation increases. It will be understood, also, that the construction illustrated, wherein the blade is outwardly splayed, in a gradual manner, at its root 18 is very effective even though the relationship $A/B$ is not constant. In some cases it may be deemed desirable, in order to effect economies in the machining of the aperture 34 in the base members 30, or for other reasons, to maintain the angle $\theta$ constant at a value providing maximum strength in the fiberglass outer layer 21. While this construction is less satisfactory than the one described above since it permits slightly unequal stress distribution, nevertheless it is far superior to the prior art constructions wherein the splayed, integral, root had no definite relationship whatever to the actual blade configuration and where the outward projections at the root, though integral with the plastic mass, are externally applied and may be sheared off along a shear line generally conforming to the plane of the outer periphery of the blade, without shearing through a reinforcing layer of fabric or the like.

Several additional features of construction will be apparent from a consideration of Figures 5 and 6. It will be noted, for example, that a slight narrowing taper is provided in the blade portion 17 so that the thickness of the tip is slightly less than the thickness at the aperture 34. Since the aperture 34 takes the configuration of the blade air foil and since the air foil remains substantially the same throughout the blade length, the blade may readily be inserted in the aperture 34 from below to assume the position shown in Figures 4 and 5. In practice, the slight twisting of the blade about the axis 19 is insufficient to prevent ready insertion of the blade into the base.

It will also be noted that as shown in Figures 4 and 5, the base end 22 of the blade root 18 is substantially flush with the bottom surface 37 of the base 30. In actual practice, the blade is molded with a slightly longer root and then machined to be flush with the base 30 for close contact of the bottom of the groove 33 by the base 22. It will be understood that in practice, the base 22 of the root 18 may be machined off to a lesser extent if it is desired that the slot 33 be slightly deeper than the bar 30, so that the base 22 of the blade will be in snug contact with the base 33a of slot 33.

While it has been stated above that the preferred materials for use with the present invention are fiberglass woven fabric and a polymerizable polyester hardenable resin, it is to be understood that the present invention contains within its scope the manufacture of blades from any laminated material, including for example wood fibers, in which the laminar structure has selective strength properties such that the tensile strength of the impregnated fibers, subsequent to the curing of the impregnating plastic is substantially greater than the shear strength of the impregnating plastic material unreinforced. It will be apparent that by providing the gradual splaying outwardly of the outer laminar surface layer in the manner shown will provide maximum strength with materials having such characteristics.

It will thus be apparent that we have provided a novel and highly valuable improvement in the art of blade construction and which is especially useful in the construction of blading subject to large forces tending to uproot the blade. While a few modifications have been discussed above, it will also be clear that further changes and variations may be made in the structure hereinabove set forth without departing from the scope of the novel concepts of the present invention. Therefore, we intend that the scope of the present invention be limited solely by the appended claims.

We claim as our invention:

1. A blade comprising a plurality of layers of woven fibrous material having the general peripheral dimensions of the blade, a plurality of short layers of fibrous material positioned on each side of said blade at one end thereof, a wrapping of fibrous material surrounding said above mentioned layers, plastic bonding means impregnating and securing said layers in said wrapper into a finished blade having an enlarged root portion formed by said short layers, said first named plurality of layers and said wrapping material and having a gradual taper in the wrapping material covering said short layers to provide a gradually outwardly splayed blade root which maintains a generally air-foiled configuration in transverse cross section.

2. The method of manufacturing a blade which comprises the steps of stacking a plurality of long layers of fibrous material, stacking a plurality of short layers of fibrous material at one end of the stack of the long layers and on both sides thereof, wrapping both the long and the short layers in a continuous shroud of fibrous material, impregnating said layers and shroud with a hardenable plastic material, pressing the impregnated layers and shroud into the air-foil configuration of a blade with a root at the end having the short layers thereon, and setting the hardenable plastic material.

3. A laminated blade comprising a plurality of elongated woven fabric laminations in stacked relation, a plurality of short layers of woven fabric at one end of said stack of laminations on both sides of the stack, a cover of woven fabric wrapped around said laminations and said short layers, plastic bonding material impregnating said cover and said laminations and said short layers and bonding the same together in integral bonded relation, and said bonded together cover, said laminations and said short layers being shaped to define an air-foil along the length of said laminations with a thickened root portion at that end of said laminations having said short layers thereon.

4. In combination with a rotor having a dovetail slot in the periphery thereof with tapering side walls converging to the narrow end of the slot at said periphery, an elongated base member in said slot and conforming in shape with said slot to wedgingly engage the tapering side walls of the slot, said base member having an elongated air-foil shaped aperture therethrough with side walls converging toward the periphery of the rotor to provide internal wedging side walls, a blade of air-foil configuration composed of a plurality of layers of laminated fabric and an outer layer of fabric wound around the laminated layers, each of said fabric layers being bonded together with a plastic material impregnated therethrough, one end of said blade having a root portion in said air-foil shaped aperture of the base member and formed by outwardly extending additional layers of fabric defining a tapered end mating with the air-foil shaped aperture of said base member whereby the laminated blade is retained in the base member by a wedge fit between the root and the aperture of the base member while the base member is held in the rotor by a wedge fit between the base member and said dovetail slot in the periphery of the rotor.

References Cited in the file of this patent

UNITED STATES PATENTS

| | | |
|---|---|---|
| 1,035,364 | Leblanc | Aug. 13, 1912 |
| 2,484,141 | Alex | Oct. 11, 1949 |
| 2,630,868 | Ellenberger | Mar. 10, 1953 |
| 2,650,803 | Rosskopf | Sept. 1, 1953 |
| 2,767,460 | Schultz | Oct. 23, 1956 |
| 2,830,647 | Warnken | Apr. 15, 1958 |

FOREIGN PATENTS

| | | |
|---|---|---|
| 375,059 | France | May 4, 1907 |
| 502,409 | Great Britain | Mar. 13, 1939 |
| 526,543 | Great Britain | Sept. 20, 1940 |
| 861,978 | France | Nov. 22, 1940 |